(12) United States Patent
Yamamoto

(10) Patent No.: US 11,703,856 B2
(45) Date of Patent: Jul. 18, 2023

(54) MOVING BODY, STEERING SYSTEM, CONTROL METHOD, AND PROGRAM

(71) Applicant: SONY GROUP CORPORATION, Tokyo (JP)

(72) Inventor: Kazunori Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/603,639

(22) PCT Filed: Mar. 3, 2020

(86) PCT No.: PCT/JP2020/008875
§ 371 (c)(1),
(2) Date: Oct. 14, 2021

(87) PCT Pub. No.: WO2020/217715
PCT Pub. Date: Oct. 29, 2020

(65) Prior Publication Data
US 2022/0197278 A1 Jun. 23, 2022

(30) Foreign Application Priority Data
Apr. 23, 2019 (JP) ............................ JP2019-081776

(51) Int. Cl.
*G05D 1/00* (2006.01)
*B64C 39/02* (2023.01)
(Continued)

(52) U.S. Cl.
CPC ......... *G05D 1/0038* (2013.01); *B64C 39/024* (2013.01); *B64D 47/08* (2013.01);
(Continued)

(58) Field of Classification Search
CPC ................ G05D 1/0038; B64C 39/024; B64U 2201/10; B64U 2101/30
See application file for complete search history.

(56) References Cited

U.S. PATENT DOCUMENTS

2015/0268666 A1* 9/2015 Wang .................... B64C 39/024
 701/2
2018/0107213 A1 4/2018 Kuhara

FOREIGN PATENT DOCUMENTS

CN 103426282 A 12/2013
CN 107428411 A 12/2017
(Continued)

OTHER PUBLICATIONS

International Search Report and Written Opinion of PCT Application No. PCT/JP2020/008875, dated May 26, 2020, 08 pages of ISRWO.

*Primary Examiner* — Minh Q Phan
(74) *Attorney, Agent, or Firm* — Chip Law Group

(57) ABSTRACT

[Object]
[Solving Means] A moving body according to an embodiment of the present technology includes an imaging unit, a first detection unit, and a control unit. The first detection unit detects a front direction of the moving body. The control unit controls a posture around a first axis of the imaging unit to a posture specified by a steering apparatus based on an output of the first detection unit, an output of a second detection unit that detects a front direction of the steering apparatus that steers the imaging unit, and input data generated by the steering apparatus.

13 Claims, 11 Drawing Sheets

(51) Int. Cl.
*B64D 47/08* (2006.01)
*B64U 101/30* (2023.01)
(52) U.S. Cl.
CPC ....... *G05D 1/0055* (2013.01); *B64U 2101/30* (2023.01); *B64U 2201/10* (2023.01)

(56) References Cited

FOREIGN PATENT DOCUMENTS

| | | |
|---|---|---|
| JP | 2012-186591 A | 9/2012 |
| JP | 2017-509034 A | 3/2017 |
| JP | 2017-119501 A | 7/2017 |
| JP | 2018-097886 A | 6/2018 |
| TW | 201522164 A | 6/2015 |
| WO | 2015/014116 A1 | 2/2015 |

\* cited by examiner

MOVING BODY, STEERING SYSTEM, CONTROL METHOD, AND PROGRAM

CROSS REFERENCE TO RELATED APPLICATIONS

This application is a U.S. National Phase of International Patent Application No. PCT/JP2020/008875 filed on Mar. 3, 2020, which claims priority benefit of Japanese Patent Application No. JP 2019-081776 filed in the Japan Patent Office on Apr. 23, 2019. Each of the above-referenced applications is hereby incorporated herein by reference in its entirety.

TECHNICAL FIELD

The present technology relates to a moving body, a steering system, and a control method of an imaging unit mounted to the moving body, and a program.

BACKGROUND ART

In the related art, a technique for steering a remote control moving body such as a drone is disclosed (e.g., Patent Literature 1). In general, a camera for aerial imaging a scenery or the like is mounted to the moving body.

CITATION LIST

Patent Literature

Patent Literature 1: Japanese Patent Application Laid-open No. 2018-097886

DISCLOSURE OF INVENTION

Technical Problem

When mounting the camera to the moving body, the camera may be mounted together with a mechanism for changing a direction of the camera by rotating at least around one axis, or by rotating around three axes. In a case where the moving body equipped with such a mechanism is stopped, it is easy to control the direction of the camera. However, in a case where the moving body moves violently, the field of view may be swung around in response to the movement of the moving body. Therefore, in order to keep photographing a specific direction by the camera while moving the moving body to various points, it is necessary to keep the camera directed in the specific direction.

In view of the above-described circumstances, the present technology enables continuous photographing of a direction desired by a user without depending on a posture of the moving body, for example.

Solution to Problem

In order to solve the above problems, a moving body according to an embodiment of the present technology includes an imaging unit, a first detection unit, and a control unit.

The first detection unit detects a front direction of the moving body.

The control unit controls a posture around a first axis of the imaging unit to a posture specified by the steering apparatus on the basis of an output of the first detection unit, an output of a second detection unit that detects a front direction of a steering apparatus that maneuvers the imaging unit, and input data generated by the steering apparatus.

The first detection unit may detect a tilt around a second axis of the moving body, the second detection unit may detect a tilt of the steering apparatus with respect to a horizontal direction, and the control unit may control a posture of the imaging unit around the second axis to a posture specified by the steering apparatus based on the outputs of the first and second detection units.

The first detection unit may detect a tilt around a third axis of the moving body, the second detection unit may detect a tilt of the steering apparatus with respect to a vertical direction, and the control unit may control a posture of the imaging unit around the third axis to the posture specified by the steering apparatus based on the outputs of the first and second detection units.

The moving body may further includes a main body of the moving body; and a gimbal that connects the main body of the moving body and the imaging unit and supports the imaging unit rotatably around the first, second, and third axes.

The control unit may calculate a control angle, which is a necessary angle for shifting a current posture of the imaging unit to a posture specified by the control unit, based on outputs of the first detection unit and the control unit.

The control unit may calculate, as the control angle around the first axis, a difference between an angle formed by the front direction of the steering apparatus and an input direction input to the steering apparatus, and an angle formed by the front direction of the steering apparatus and the front direction of the moving body.

The control unit may calculate, as the control angle around the second axis, a difference between an angle formed by the third axis and the horizontal direction and an angle formed by the steering apparatus and the horizontal direction.

The control unit may calculate, as the control angle around the third axis, a difference between an angle formed by the first axis and the vertical direction and an angle formed by the steering apparatus and the vertical direction.

The first detection unit may include a geomagnetic sensor for detecting the front direction of the moving body, and an acceleration sensor for detecting the tilts around the second and third axes of the moving body, and the second detection unit may include a geomagnetic sensor for detecting the front direction of the steering apparatus, and an acceleration sensor for detecting the tilts with respect to the horizontal direction and the vertical direction of the steering apparatus.

The moving body may be a flight body.

In order to solve the above problems, a steering system according to an embodiment of the present technology includes a moving body and a steering apparatus.

The moving body includes an imaging unit, a first detection unit, and a control unit.

The first detection unit detects a front direction of the moving body.

The control unit controls a posture around a first axis of the imaging unit to a posture specified by a steering apparatus based on an output of the first detection unit, an output of a second detection unit that detects a front direction of the steering apparatus that steers the imaging unit, and input data generated by the steering apparatus.

The steering apparatus includes the second detection unit and controls the imaging unit.

In order to solve the above problems, a control method of a control unit according to an embodiment of the present technology includes:

acquiring an output of a first detection unit for detecting a front direction of a moving body;

acquiring an output of a second detection unit for detecting a front direction of a steering apparatus for steering an imaging unit mounted on the moving body;

acquiring input data generated by the steering apparatus; and controlling a posture of the imaging unit to a posture specified by the steering apparatus based on the outputs of the first and second detection units and the input data.

In order to solve the above problems, a program according to an embodiment of the present technology causes a moving body to execute the following steps of:

acquiring an output of a first detection unit for detecting a front direction of a moving body;

acquiring an output of a second detection unit for detecting a front direction of a steering apparatus for steering an imaging unit mounted on the moving body;

acquiring input data generated by the steering apparatus; and controlling a posture of the imaging unit to a posture specified by the steering apparatus based on the outputs of the first and second detection units and the input data.

MODE(S) FOR CARRYING OUT THE INVENTION

Hereinafter, embodiments of the present technology will be described with reference to the drawings.

<Configuration of Steering System>

Figure 1:
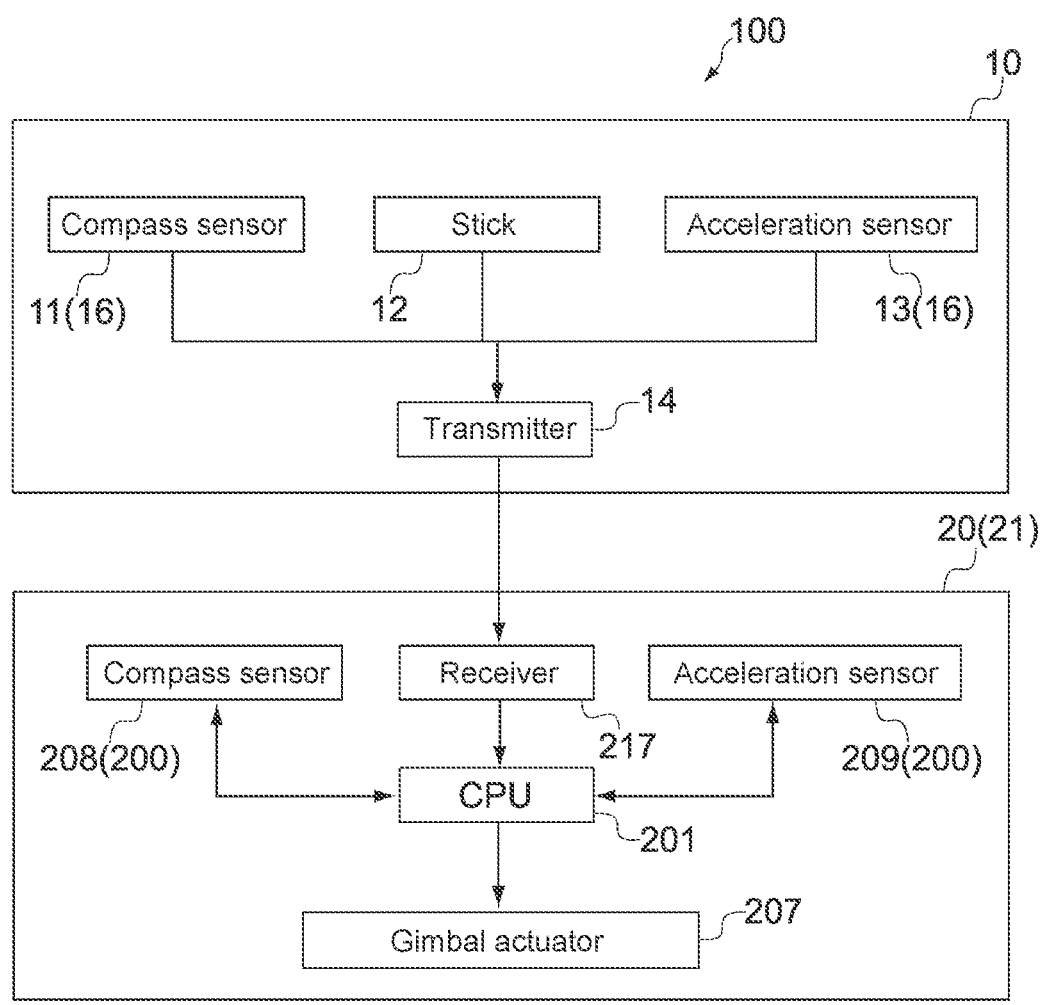
FIG. 1 is a block diagram showing a configuration example of a steering system according to an embodiment of the present technology.

FIG. 1 is a block diagram showing a configuration example of a steering system 100 according to an embodiment of the present technology. As shown in FIG. 1, the steering system 100 includes a drone airframe 20 and a controller 10 for steering a camera 23 mounted to the drone airframe 20.

[Controller]

Controller 10 includes a stick 12, a transmitter 14, a display unit 15, and a sensor group 16. The controller 10 is an example of a "steering apparatus" in the claims.

The sensor group 16 has a compass sensor 11 and an acceleration sensor 13, as shown in FIG. 1. The sensor group 16 is an example of a "second detection unit" in the claims.

The compass sensor 11 is a geomagnetic sensor that detects the magnetic field of the earth and constantly detects a front direction d2 of the controller 10 (a direction of a horizontal component intersecting perpendicularly to an upper side S2 of the controller 10 on a flat surface, which is a plane S1 of the display unit 15 of the controller 10 (see FIG. 7)). Specifically, the compass sensor 11 detects an angle θ1 (see FIG. 8) between the magnetic north d0 and the front direction d2 of the controller 10. The compass sensor 11 outputs sensor data obtained by detecting the front direction d2 of the controller 10 (angle θ1) to the transmitter 14.

The compass sensor 11 may be a two-axis or three-axis type geomagnetic sensor, and the type thereof is not limited. The compass sensor 11 may be, for example, a Hall sensor, an MR (Magneto Resistance) sensor, an MI (Magneto Impedance) sensor, or the like.

The stick 12 is an operation stick for specifying a direction with respect to the front direction d2 of the controller 10. A user specifies a posture (photographing direction) of the camera 23 in a pan direction by operating the stick 12.

The controller 10 may include an optional input control circuit (not shown). The input control circuit generates input data based on an input direction input by the user via the stick 12, and outputs the data to the transmitter 14.

Incidentally, the input data of the present embodiment is typically, but not limited to, data generated based on the input direction input to the controller 10 by the user. The input data may be, for example, data generated based on a numerical value or the like input to the controller 10 by the user.

The acceleration sensor 13 detects an acceleration of the controller 10. The acceleration sensor 13 is configured to be capable of detecting various movements such as tilt and vibration of the controller 10.

The acceleration sensor 13 constantly detects the tilt of the controller 10 in a roll direction and a tilt direction. Specifically, the acceleration sensor 13 detects an angle θ5 formed by the controller 10 and a vertical direction dv in the roll direction (see FIG. 9), and an angle θ7 formed by the controller 10 and a horizontal direction dh in the tilt direction (see FIG. 10).

The acceleration sensor 13 outputs the sensor data obtained by detecting the tilt of the controller 10 to the transmitter 14.

The user specifies the posture of the camera 23 in the roll and tilt directions by tilting the controller 10. The acceleration sensor 13 may be, for example, a piezoelectric acceleration sensor, a servo-type acceleration sensor, a strain-type acceleration sensor, a semiconductor-type acceleration sensor or the like, and the type thereof is not limited.

The transmitter 14 transmits data acquired from the compass sensor 11, the input control circuit, and the acceleration sensor 13 to a receiver 217. The transmitter 14 communications with the drone airframe 20 (main body 21 of drone airframe). The transmitter 14 functions as a communication interface of the controller 10.

The display unit 15 displays a picture photographed by the camera 23. The user may operate the controller 10 while viewing the picture displayed on the display unit 15. The display unit 15 may be, for example, a display device such as an LCD (Liquid Crystal Display) or an organic EL (Electro-Luminescence) display. The display unit 15 may be omitted as necessary.

[Drone Airframe]

The drone airframe 20 includes a main body 21 of the drone airframe, a gimbal 22, and the camera 23. The drone airframe 20 is an example of a "moving body" in the claims.

(Main Body of Drone Airframe)

The main body 21 of the drone airframe has a sensor group 200, a CPU 201, a gimbal actuator 207, and the receiver 217. The main body 21 of the drone airframe is an example of a "main body of moving body" in the claims.

The sensor group 200 detects the posture (front direction d1 and tilt) of the drone airframe 20. The sensor group 200 includes a compass sensor 208 and an acceleration sensor 209. The sensor group 200 is an example of a "first detection unit" in the claims.

The compass sensor 208 is the geomagnetic sensor that detects the magnetic field of the earth and constantly detects the front direction d1 of the drone airframe 20 (direction moving by moving instructions to front, rear, left, and right by controller 10). Specifically, the compass sensor 208 detects an angle θ2 (see FIG. 8) formed by the magnetic north d0 and the front direction d1 of the drone airframe 20.

The compass sensor 208 outputs sensor data obtained by detecting the front direction d1 (angle θ2) of the drone airframe 20 to the CPU 201.

The compass sensor 208 may be the two-axis or three-axis type geomagnetic sensor, and the type thereof is not limited. The compass sensor 208 may be, for example, the Hall sensor, the MR (Magneto Resistance) sensor, the MI (Magneto Impedance) sensor, or the like.

The acceleration sensor 209 detects the acceleration of the drone airframe 20. The acceleration sensor 209 is configured to be capable of detecting various movements such as the tilt and the vibration of the drone airframe 20.

The acceleration sensor 209 constantly detects the tilt of the drone airframe 20 in the roll and tilt directions. Specifically, the acceleration sensor 209 detects angles θ6 and (see FIGS. 9 and 10) formed by the drone airframe 20 and the vertical direction dv and the horizontal direction dh. In the present embodiment, the angle θ6 is an angle formed between a rotation axis X1 and the vertical direction dv to be described later, and the angle θ8 is an angle formed between a rotation axis X3 and the horizontal direction dh to be described later.

The acceleration sensor 209 outputs sensor data obtained by detecting the tilt of the drone airframe 20 to the CPU 201. The acceleration sensor 209 may be, for example, the piezoelectric acceleration sensor, the servo-type acceleration sensor, the strain-type acceleration sensor, the semiconductor-type acceleration sensor or the like, and the type thereof is not limited.

The CPU 201 functions as an arithmetic processing unit and a control unit, and controls entire or a part of operations of the drone airframe 20 (main body 21 of drone airframe) in accordance with various programs recorded in a ROM 202, a RAM 203, a storage apparatus 213, or a removable recording medium 30, which will be described later.

The CPU 201 generates a control signal based on data obtained from the compass sensor 208, the acceleration sensor 209, and the receiver 217, and outputs the signal to the gimbal actuator 207. The CPU 201 is an example of a "control unit" in the claims.

The gimbal actuator 207 is a drive device that drives the gimbal 22 by converting the control signal acquired from the CPU 201 into physical motion.

The gimbal actuator 207 controls the posture of the camera 23 (photographing direction) based on the control signal obtained from the CPU 201 via the gimbal 22. An electric type, a hydraulic type, or a pneumatic type of the gimbal actuator 207 may be employed, for example, and the types thereof is not limited.

The receiver 217 receives data output from the compass sensor 11, the input control circuit, and the acceleration sensor 13 from the transmitter 14, and outputs the data to the CPU 201. The receiver 217 communicates with the controller 10 (transmitter 14). The receiver 217 functions as a communication interface of the main body 21 of the drone airframe (drone airframe 20).

Figure 2:
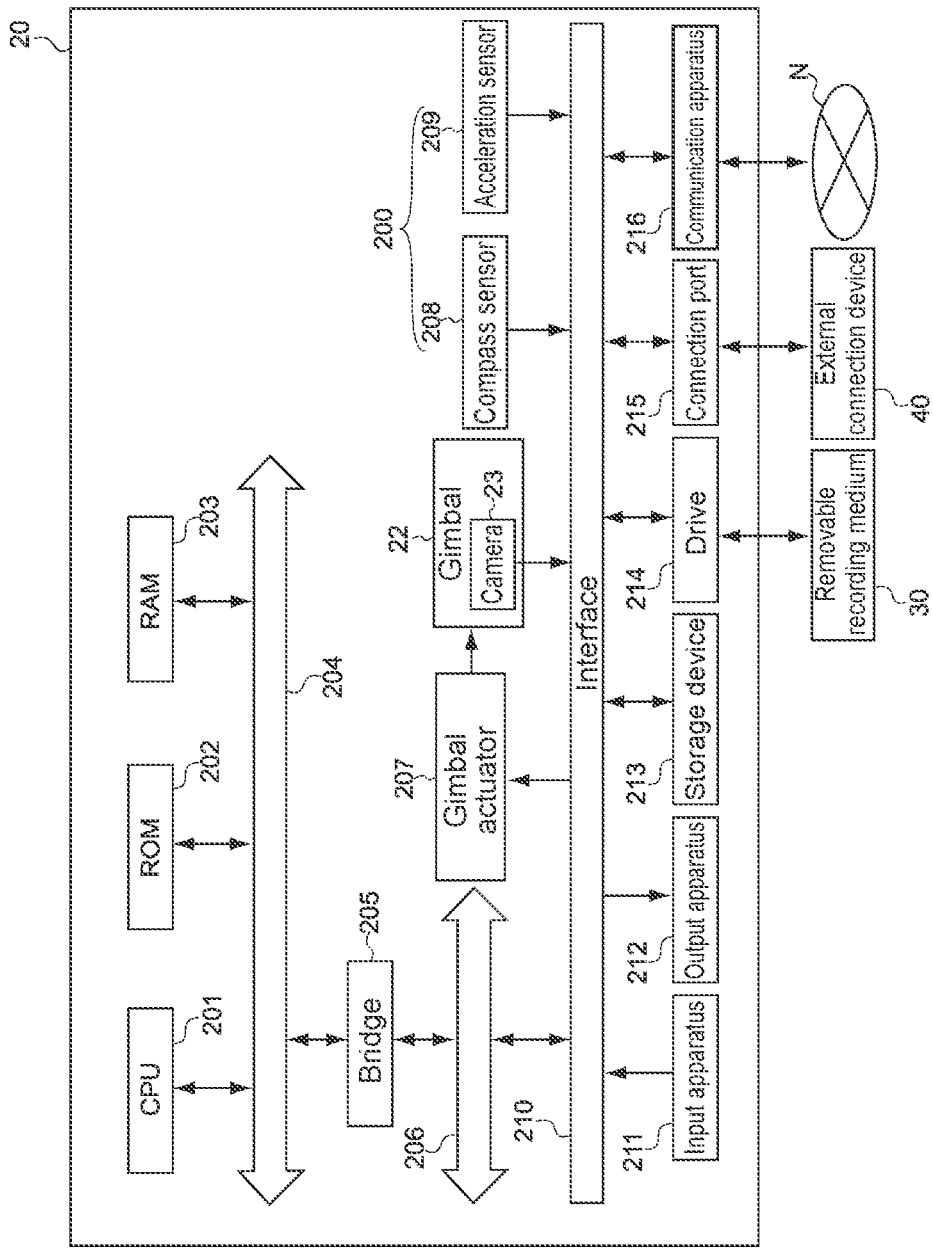
FIG. 2 is a block diagram showing a configuration example of a drone airframe of the steering system.

FIG. 2 is a block diagram showing a configuration example of the drone airframe 20. The drone airframe 20 includes the CPU (Central Processing Unit) 201, the ROM (Read Only Memory) 202, and the RAM (Random Access Memory) 203.

The drone airframe 20 may include a host bus 204, a bridge 205, an external bus 206, an interface 210, an input apparatus 211, an output apparatus 212, a storage apparatus 213, a drive 214, a connection port 215, and a communication apparatus 216.

Additionally, the drone airframe 20 may have processing circuits such as a DSP (Digital Signal Processor), an ASIC (Application Specific Integrated Circuit), or an FPGA (Field-Programmable Gate Array) in place of or with the CPU 201. In addition, the drone airframe 20 may include a GPS receiver that receives a GPS (Global Positioning System) signal to measure a latitude, a longitude, and an altitude of the device.

The ROM 202 stores programs and arithmetic parameters used by the CPU 201. The RAM 203 primarily stores the programs used in executing the CPU 201, the parameters that change accordingly in executing the programs, and the like.

The CPU 201, the ROM 202, and the RAM 203 are connected to each other by the host bus 204 including an internal bus such as a CPU bus. In addition, the host bus 204 is connected to the external bus 206 such as a PCI (Peripheral Component Interconnect/Interface) bus via the bridge 205.

The input apparatus 211 is an apparatus operated by the user such as a mouse, a keyboard, a touch panel, a button, a switch, and a lever. The input apparatus 211 may be, for example, a remote control apparatus using infrared rays or other radio waves, or may be an external connection device 40 such as a mobile phone corresponding to the operation of the drone airframe 20.

The input apparatus 211 includes an input control circuit for generating an input signal based on information input by the user and outputting the input signal to the CPU 201. By operating the input apparatus 211, the user inputs a variety type of data to the drone airframe 20 and instructs an processing operation.

The output apparatus 212 includes an apparatus capable of notifying the user of the acquired information using visual, hearing, tactile senses, or the like. The output apparatus 212 may be, for example, a display device such as the LCD or the organic EL display, a voice output apparatus such as a speaker and a headphone, or a vibrator. The output apparatus 212 outputs a result obtained by processing of the drone airframe 20 as a text, a picture such as an image, a sound such as acoustic or a voice, a vibration, or the like.

The storage apparatus 213 is an apparatus for storing data configured as an example of a storage unit of the drone airframe 20. The storage apparatus 213 includes, for example, a magnetic storage device such as a HDD (Hard Disk Drive), a semi-conductor storage device, an optical storage device, a magneto-optical storage device, or the like. The storage apparatus 213 stores, for example, the program executed by the CPU 201, a variety of data, and a variety of data acquired from the outside.

The drive 214 is a reader/writer for a removable recording medium 30 such as a magnetic disk, an optical disk, a magneto-optical disk, or a semiconductor memory, and is built-in or externally attached to the drone airframe 20. The drive 214 reads out the information recorded in the removable recording medium 30 and outputs the information to the RAM 203. Moreover, the drive 214 writes a record in the mounted removable recording medium 30.

The connection port 215 is a port for connecting a device to the drone airframe 20. The connection port 215 may be, for example, a USB (Universal Serial Bus) port, an IEEE1394 port, an SCSI (Small Computer System Interface) port, or the like. Furthermore, the connection port 215 may be an RS-232C port, an optical audio terminal, an HDMI (registered trademark) (High-Definition Multimedia Interface) port, or the like. By connecting the external connection device 40 to the connection port 215, a variety of data can be exchanged between the drone airframe 20 and the external connection device 40.

The communication apparatus 216 is, for example, a communication interface including a communication device for connecting to a network N. The communication apparatus 216 may be, for example, a communication card for LAN (Local Area Network), Bluetooth (registered trademark), Wi-Fi, or WUSB (Wireless USB).

In addition, the communication apparatus 216 may be a router for optical communication, a router for ADSL (Asymmetric Digital Subscriber Line), or a modem for various types of communications. The communication apparatus 216 transmits and receives a signal and the like to and from the Internet or other communication device using a predetermined protocol such as TCP/IP.

In addition, the network N connected to the communication apparatus 216 may be a wired or wirelessly connected network, and may include, for example, the Internet, a home LAN, infrared communication, radio wave communication, or satellite communication. The receiver 217 may be the communication apparatus 216.

(Gimbal) FIGS. 3A, 3B, 4A, and 4B are schematic views showing an example of a configuration of the gimbal 22, and are views showing an operation of the gimbal 22. Hereinafter, the configuration of the gimbal 22 will be described as an example by taking rotation axes X1 (first axis), X2 (second axis), and X3 (third axis) being parallel to the Z-axis, the X-axis, and the Y-axis, respectively. Incidentally, X, Y and Z axes shown in FIGS. 3A, 3B, 4A, and 4B are three axial directions perpendicular to each other, and are also common in the following figures.

The gimbal 22 is a three-axis gimbal that connects the main body 21 of the drone airframe and the camera 23, and rotatably supports the camera 23 around the respective rotation axes X1, X2, and X3. The gimbal 22 has, as shown in FIGS. 3A, 3B, 4A and 4B, a base portion 22a, a first connecting portion 22b, a second connecting portion 22c, and a third connecting portion 22d. Incidentally, the pan direction, the tilt direction, and the roll direction are directions around the rotation axes X1, X2, and X3, respectively, and the same is applied in the following description.

A base portion 22a is provided on the main body 21 of the drone airframe. The base portion 22a rotates a first connecting portion 22b in the pan direction. The base portion 22a rotatably supports the first connecting portion 22b around the rotation axis X1.

Figure 3A:
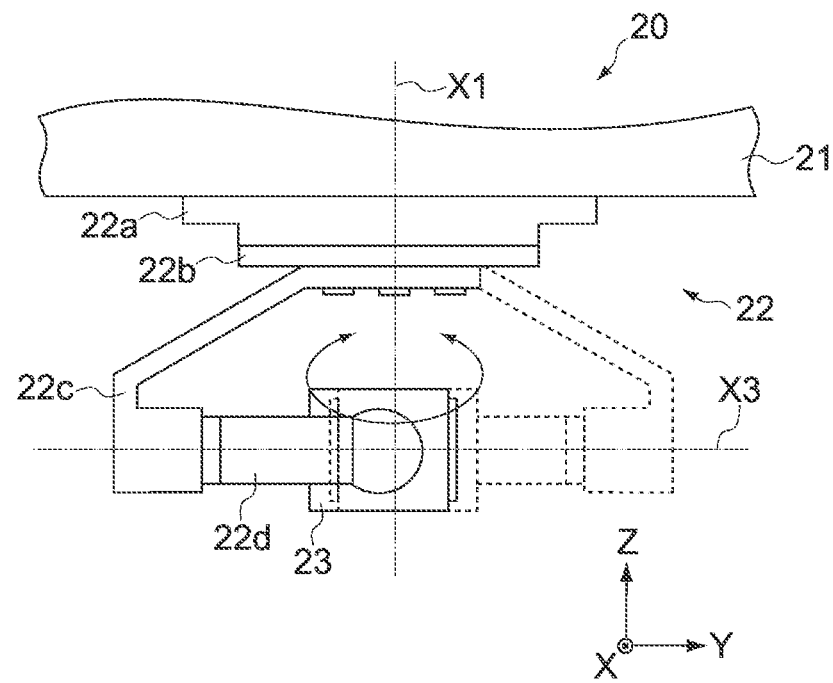
FIGS. 3A and 3B are schematic views showing a configuration example of a gimbal of the drone airframe.

The first connecting portion 22b connects the base portion 22a and the second connecting portion 22c. The base portion 22a rotates the first connecting portion 22b around the rotation axis X1, to thereby rotating the second connecting portion 22c around the rotation axis X1 via the first connecting portion 22b, as shown in FIG. 3A.

Figure 4A:
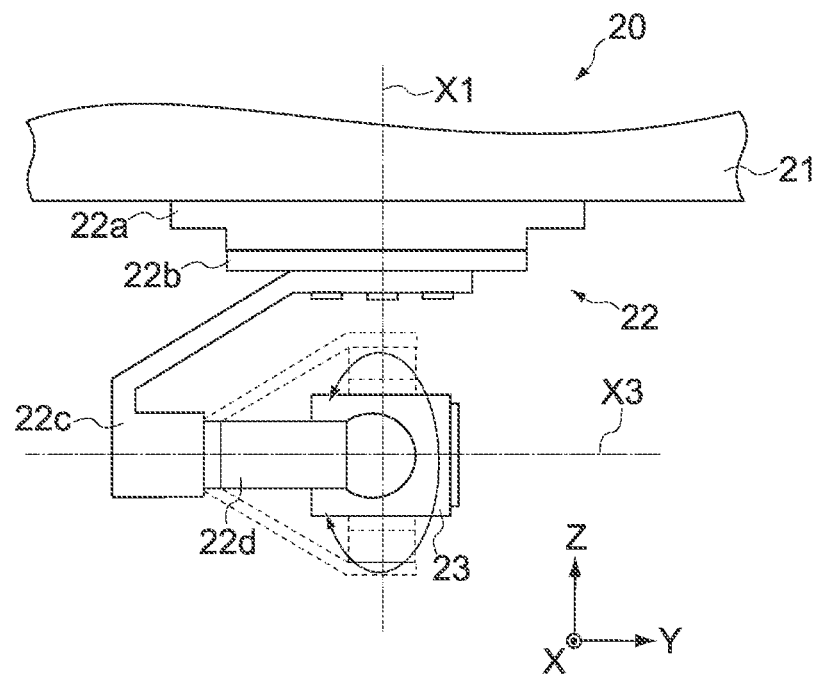
FIGS. 4A and 4B are schematic views showing a configuration example of the gimbal.
Figure 4B:
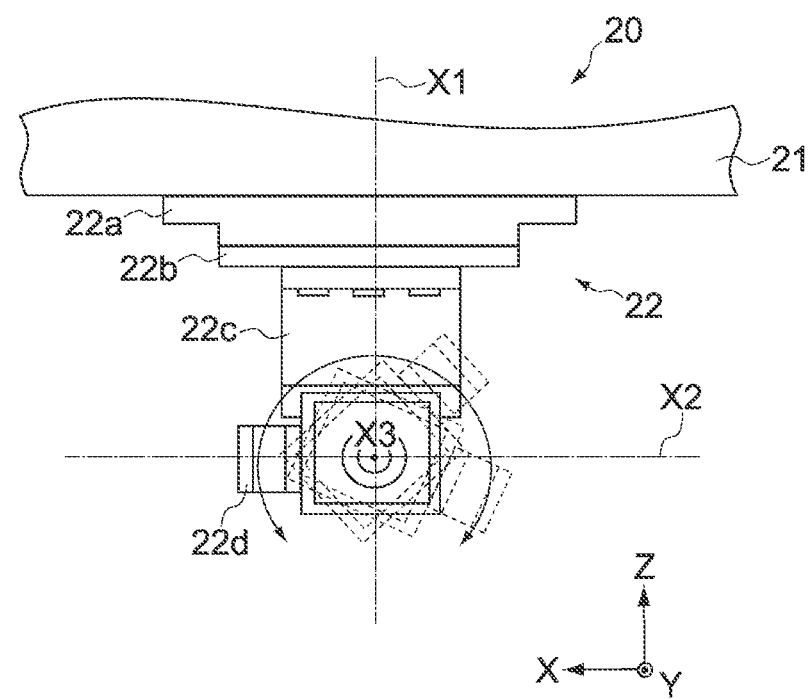

The second connecting portion 22c is fastened to the first connecting portion 22b, and is rotatably supported around the rotation axis X1 to the first connecting portion 22b. The second coupling portion 22c connects the first coupling portion 22b and the third coupling portion 22d, and rotates the third coupling portion 22d in the roll direction. The second connecting portion 22c rotatably supports the third connecting portion 22d around the rotation axis X3, as shown in FIGS. 4A and 4B.

Figure 3B:
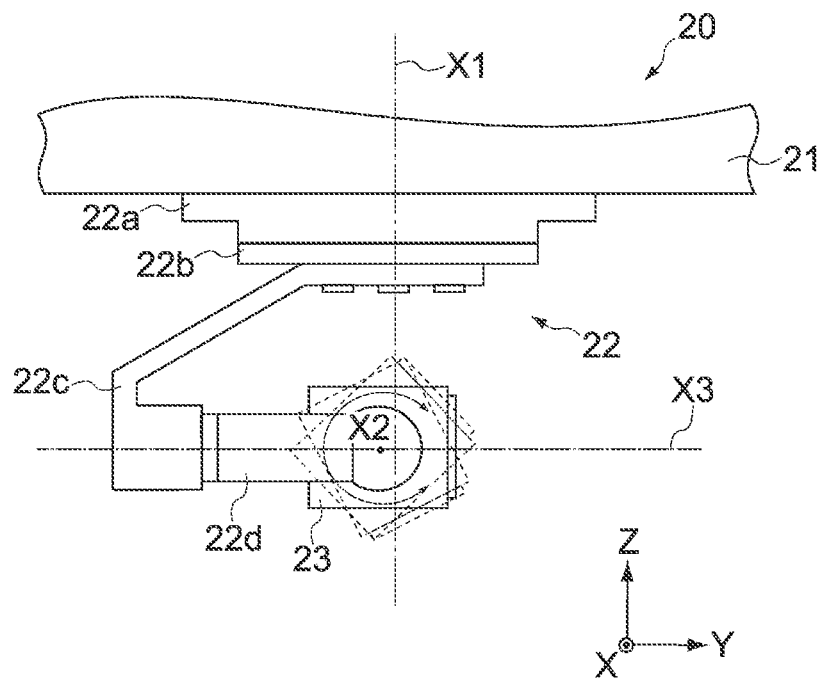

The third connecting portion 22d connects the second connecting portion 22c and the camera 23 and rotates the camera 23 in the tilt direction. The third connecting portion 22d rotatably supports the camera 23 around the rotation axis X2, as shown in FIG. 3B.

Here, if the gimbal 22 of the present embodiment is configured as shown in FIGS. 3A, 3B, 4A, and 4B, the gimbal actuator 207 is an electric motor (not shown) to be accommodated in each of the base portion 22a, and the second and third connecting portions 22c and 22d, for example.

In this case, the electric motor housed in the base portion 22a converts the control signal (electric power) obtained from the CPU 201 into motive power for rotating the first connecting portion 22b around the rotation axis X1.

Furthermore, the electric motor housed in the second connecting portion 22c converts the control signal obtained from the CPU 201 into the motive power for rotating the third connecting portion 22d around the rotation axis X3. The electric motor housed in the third connecting portion 22d converts the control signal into the motive power for rotating the camera 23 around the rotation axis X2.

(Camera)

The camera 23 is an apparatus for generating an imaged image by capturing a real space using, for example, an image pickup device such as a CMOS (Complementary Metal Oxide Semiconductor or a CCD (Charge Coupled Device), and various members such as a lens for controlling imaging of a subject image to the image pickup device.

The camera 23 may image a still image or may image a moving image. The camera 23 is an example of the "imaging unit" in the claims.

As described above, the configuration example of the steering system 100 is shown. The respective components described above may be configured by using general-purpose members or may be configured by members and materials specialized for functions of the respective components. Such a configuration may be changed as appropriate in a manner that depends on the technical level at the time of implementation.

<Operation of Control System>

Figure 5:
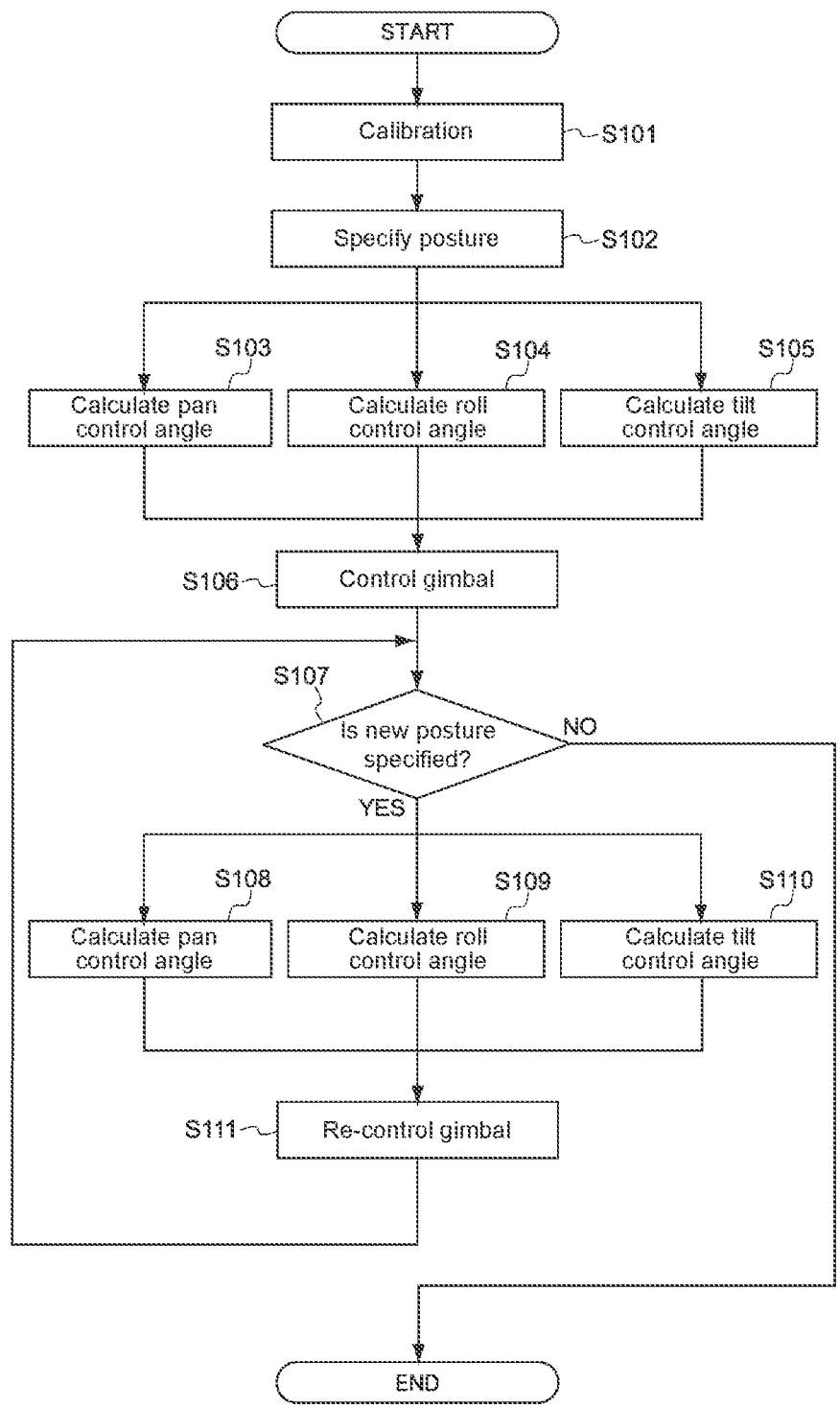
FIG. 5 is a flowchart showing a flow of a typical operation of the steering system.
Figure 6:
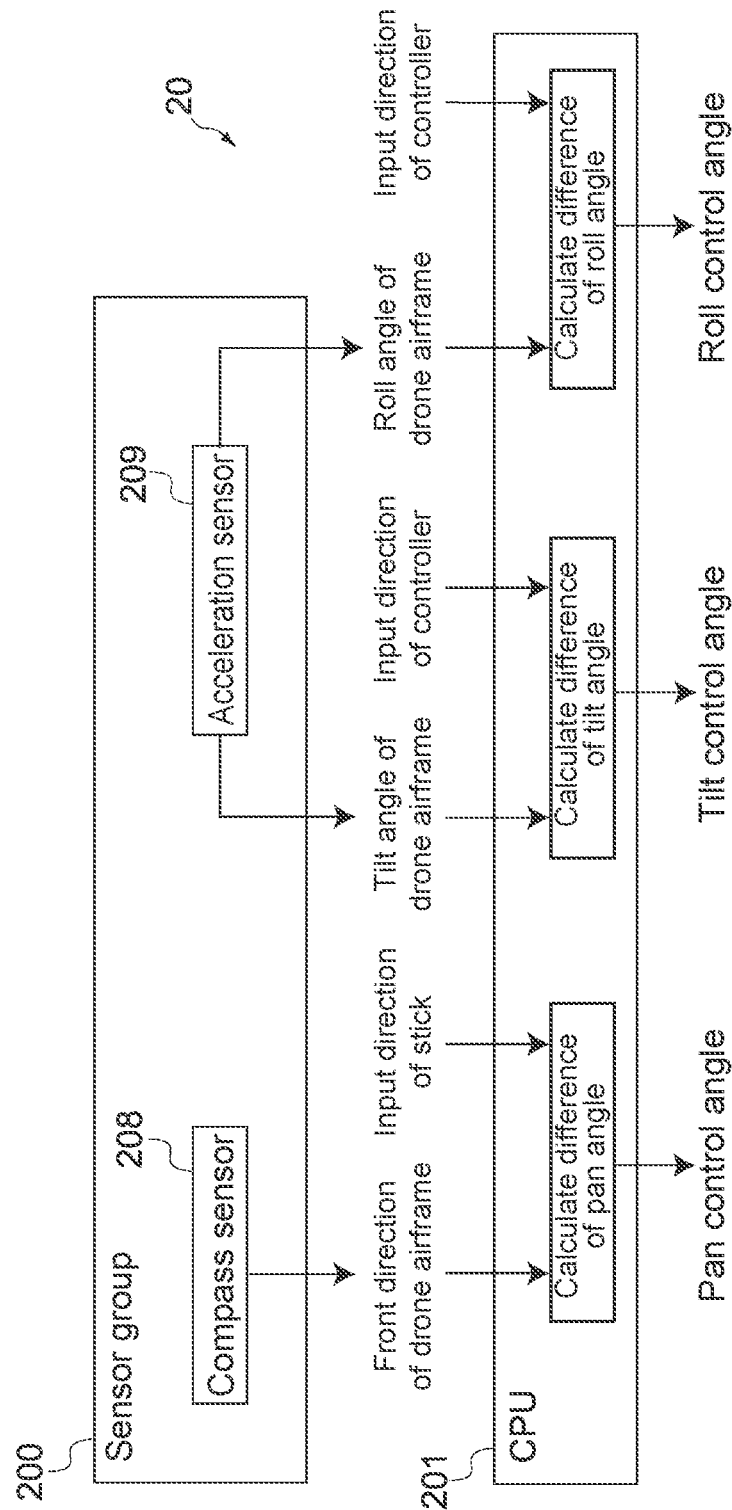
FIG. 6 is a conceptual diagram showing an example of arithmetic processing performed by the drone airframe.

FIG. 5 is a flowchart showing a flow of a typical operation of the steering system 100, and FIG. 6 is a conceptual diagram showing an example of arithmetic processing performed by the drone airframe 20. Hereinafter, the operation of the steering system 100 will be described with reference to FIG. 5 as appropriate.

[Step S101: Calibration]

First, the CPU 201 performs calibration of the compass sensors 11 and 208, the acceleration sensors 13 and 209 and the gimbal 22.

At this time, the CPU 201 calibrates the compass sensors 11 and 208 such that the front directions d2 and d1 of the controller 10 and the drone airframe 20 are parallel to the magnetic north d0, and the angles θ1 and θ2 are 0 degrees, for example.

Furthermore, the CPU 201 calibrates the acceleration sensor 209 such that the rotation axis X1 and the vertical direction dv are parallel and the angle θ6 becomes 0 degrees, and such that the rotation axis X3 and the horizontal direction dh is parallel and the angle θ8 is 0 degrees, for example.

Furthermore, the CPU 201 calibrates the acceleration sensor 13 such that the controller 10 and the horizontal direction dh are parallel and the tilt of the controller 10 in the roll direction and the tilt direction is 0 degrees, for example.

In addition, the CPU 201 calibrates the gimbal 22 such that the rotation axis X2 is parallel to the main body 21 of the drone airframe and the rotation axis X3 is parallel to the front direction d1 of the drone airframe and the optical axis direction of the camera 23.

[Step S102: Specify Posture]

Next, the user specifies the posture of the camera 23 in the pan direction by operating the stick 12 of the controller 10. As a result, the input control circuit generates input data based on the posture specified by the user via the stick 12, and outputs the data to the transmitter 14.

In addition, the user also specifies the posture of the camera 23 in the roll and tilt directions by tilting the controller 10. Thus, the acceleration sensor 13 detects the angle θ5 formed by the controller 10 in the roll direction and the vertical direction dv (angle θ5 formed by vertical direction dv and input direction d4, see FIG. 9) and angle θ7 formed by the controller 10 in the tilt direction and the horizontal direction dh (angle θ7 formed by horizontal direction dh and input direction d5, see FIG. 10), and outputs sensor data thus obtained to the transmitter 14.

[Step S103: Calculate Pan Control Angle]

Figure 7:
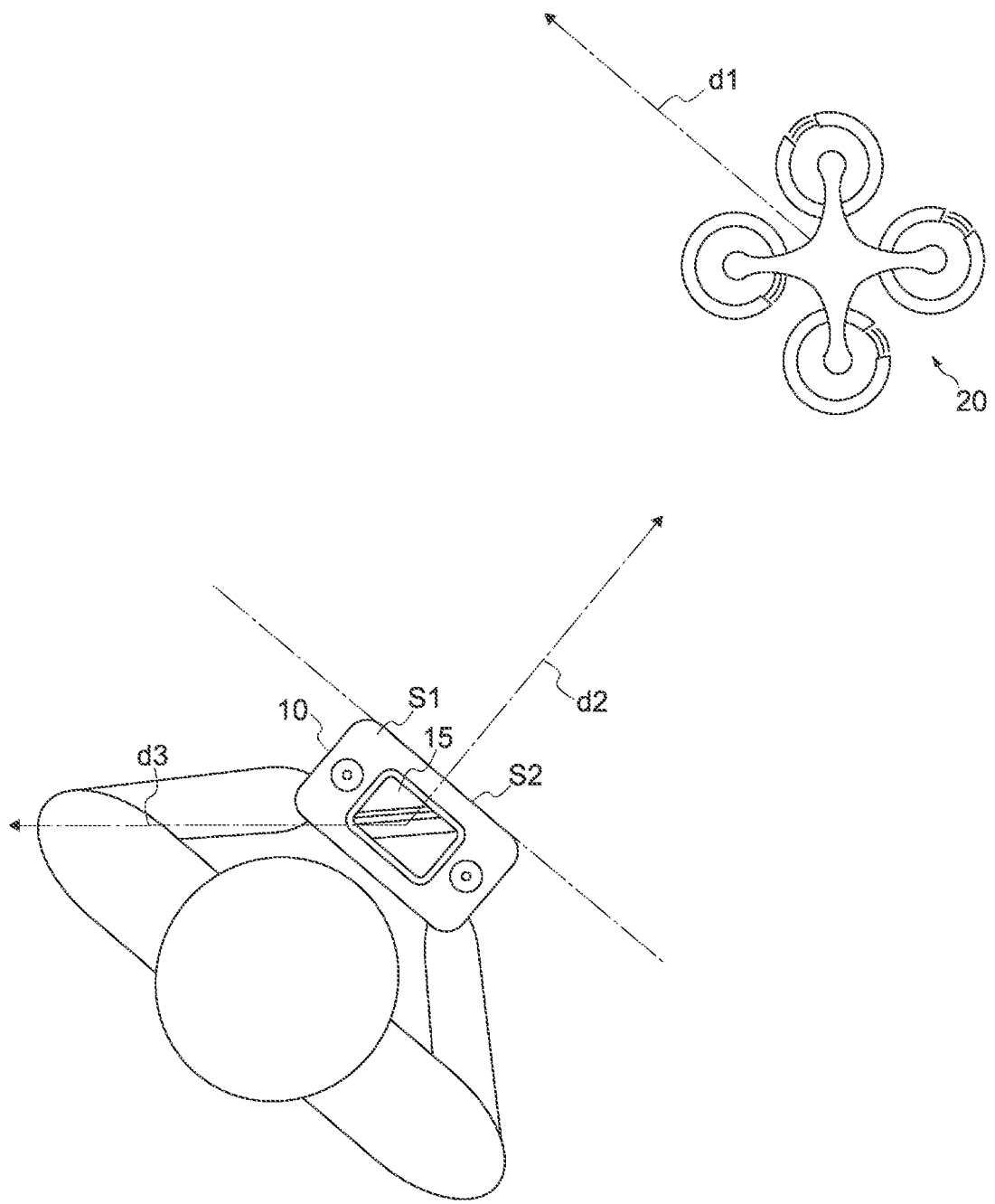
FIG. 7 is a bird's-eye view schematically showing the drone airframe and a user who operates the drone airframe.
Figure 8:
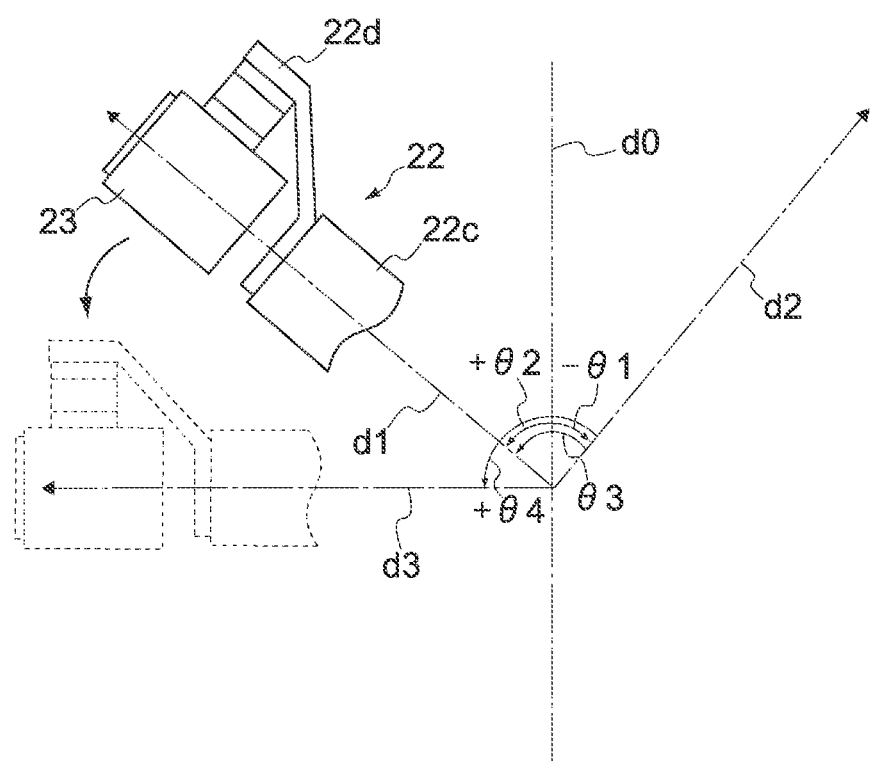
FIG. 8 is a conceptual diagram collectively showing a front direction of the drone airframe, a front direction of a controller of the steering system, and an input direction input by the user.

FIG. 7 is a bird's-eye view schematically showing the drone airframe 20 and the user who operates the drone airframe 20, and FIG. 8 is a conceptual diagram collectively showing the front directions d1 and d2 and the input direction d3 of the drone airframe 20 and the controller 10.

The CPU 201 calculates relative angles θ3 and θ4 based on data obtained from the input control circuit and sensor data (angles θ1 and θ2) acquired from the compass sensors 11 and 208. Here, the relative angle θ3 is an angle formed by the front direction d2 of the controller 10 and the front direction d1 of the drone airframe 20. In addition, the relative angle θ4 is an angle formed by the front direction d2 of the controller 10 and the input direction d3 in which the user tilts the stick 12.

Next, the CPU 201 calculates a control angle θp of the camera 23 in the pan direction based on the calculated relative angles θ3 and θ4, and outputs a control signal based on the control angle θp to the gimbal actuator 207.

Referring to FIG. 8 as an example, when a clockwise angle (direction) is defined as a negative angle (negative direction) and a counterclockwise angle (direction) is defined as a positive angle (positive direction), the control angle θp is calculated, for example, by the following equation (1). Note that the control angle described above is an angle necessary for shifting from a current posture of the camera 23 to a posture specified by the user, and the same applies to the following description.

$$\theta p = -\theta 1 + (+\theta 4) - (+\theta 2) = \theta 4 - (\theta 1 + \theta 2) = \theta 4 - \theta 3 \quad (1)$$

[Step S104: Calculate Roll Control Angle]

Figure 9:
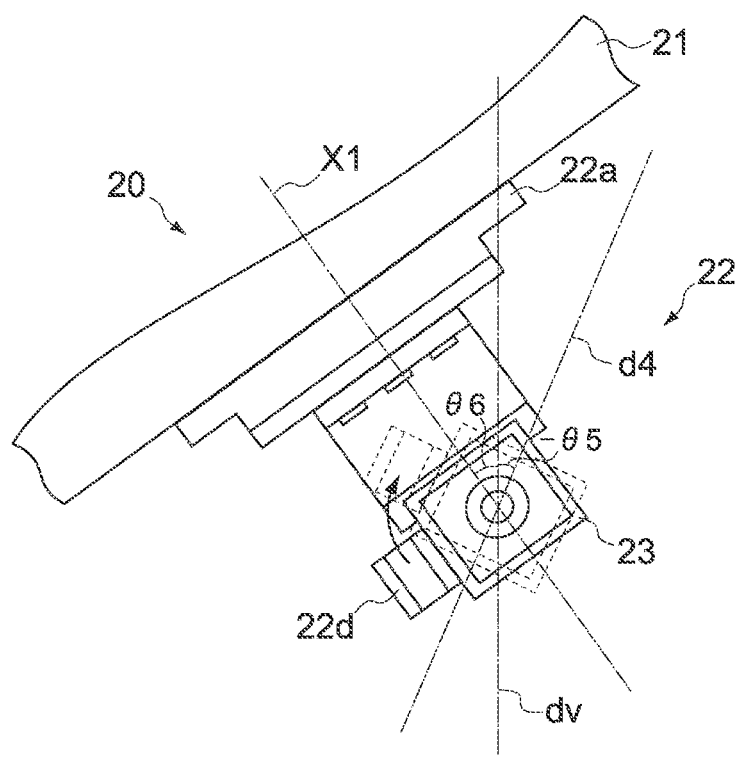
FIG. 9 is a schematic view schematically showing the drone airframe tilted in a roll direction.

FIG. 9 is a schematic view schematically showing the drone airframe 20 tilted in the roll direction. The CPU 201 calculates a control angle θr of the camera 23 in the roll direction based on the sensor data (angles θ5 and θ6) acquired from the acceleration sensors 13 and 209, and outputs the control signal based on the control angle θr to the gimbal actuator 207.

Referring to FIG. 9 as an example, when the clockwise angle (direction) is defined as the negative angle (negative direction) and the counterclockwise angle (direction) is defined as the positive angle (positive direction), the control angle θp is calculated, for example, by the following equation (2).

$$\theta r = (-\theta 5) - (+\theta 6) = -(\theta 5 + \theta 6) \quad (2)$$

[Step S105: Calculate Tilt Control Angle]

Figure 10:
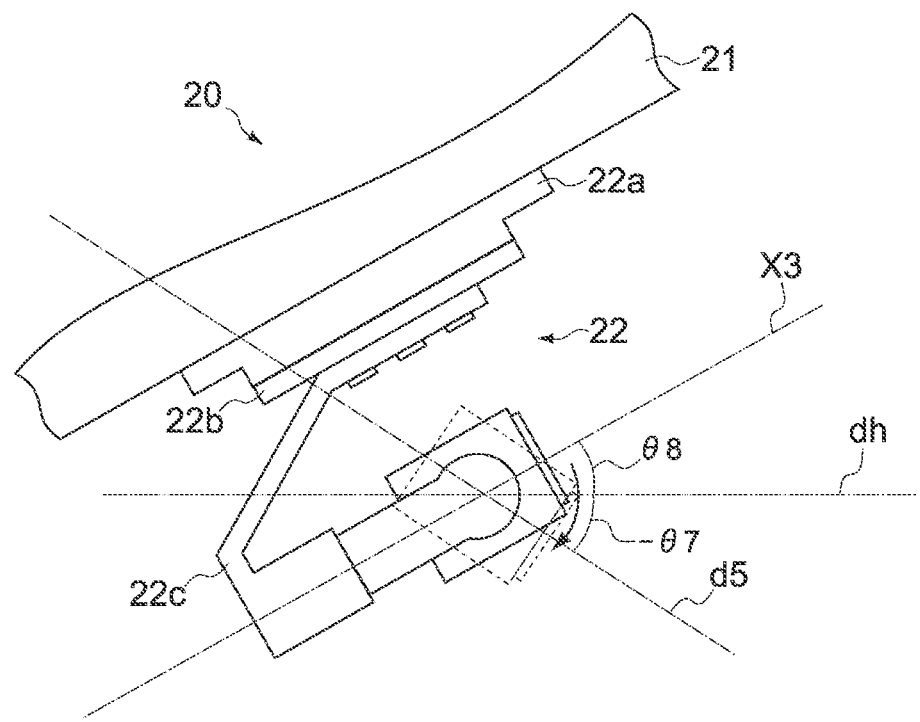
FIG. 10 is a schematic view schematically showing the drone airframe tilted in a tilt direction.

FIG. 10 is a schematic view schematically showing the drone airframe 20 tilted in the tilt direction. The CPU 201 calculates a control angle θt of the camera 23 in the tilt direction based on the sensor data (angles θ7 and θ8) acquired from the acceleration sensors 13 and 209, and outputs a control signal based on the control angle θt to the gimbal actuator 207.

Referring to FIG. 10 as an example, when the clockwise angle (direction) is defined as the negative angle (negative direction) and the counterclockwise angle (direction) is defined as the positive angle (positive direction), the control angle θp is calculated, for example, by the following equation (3).

$$\theta t = (-\theta 7) - (+\theta 8) = -(\theta 7 + \theta 8) \quad (3)$$

[Step S106: Control Gimbal]

The gimbal actuator 207 converts the control signal based on the control angle θp obtained from the CPU 201 into the motive power for rotating the first connecting portion 22b around the rotation axis X1. At this time, the gimbal actuator 207 rotates the first connecting portion 22b by θp in the positive direction. Thus, as shown in FIG. 8, the second connecting portion 22c is rotated by θp in the positive direction, and the posture of the camera 23 in the pan direction becomes the posture specified by the user.

Furthermore, the gimbal actuator 207 converts the control signal based on the control angle θr obtained from the CPU 201 into the motive power for rotating the third connecting portion 22d around the rotation axis X3. At this time, the gimbal actuator 207 rotates the third connecting portion 22d by θr in the negative direction. Thus, as shown in FIG. 9, the third connecting portion 22d is rotated by θr in the negative direction, and the posture of the camera 23 in the roll direction becomes the posture specified by the user.

Furthermore, the gimbal actuator 207 converts the control signal based on the control angle θt obtained from the CPU 201 into the motive power for rotating the camera 23 around the rotation axis X2. At this time, the gimbal actuator 207 rotates the camera 23 by θt in the negative direction. Thus, as shown in FIG. 10, the camera 23 is rotated by θt in the negative direction, and the posture of the camera 23 in the tilt direction becomes the posture specified by the user.

[Step S107: Is New Posture Specified?]

Next, when the user newly specifies the posture of the camera 23 via the controller 10 (YES in Step S107), the user newly specifies the posture of the camera 23 in the pan direction by operating the stick 12 of the controller 10. As a result, the input control circuit generates input data based on an input direction d3' input by the user via the stick 12, and outputs the data to the transmitter 14.

The user also newly specifies the posture of the camera 23 in the roll and tilt directions by tilting the controller 10. Thus, the acceleration sensor 13 detects an angle θ10 formed by the controller 10 in the roll direction and the vertical direction dv (angle θ10 formed by vertical direction dv and input direction d4', see FIG. 12), and an angle θ11 formed by the controller 10 in the tilt direction and the horizontal direction dh (angle θ11 formed by horizontal direction dh and input direction d5', see FIG. 13), and outputs the sensor data obtained to the transmitter 14.

On the other hand, when the posture of the camera 23 is not newly specified by the user via the controller 10 (NO in Step S107), that is, when the posture of the camera 23 is continuously specified via the controller 10, the specified posture is continued.

[Step S108: Calculate Pan Control Angle]

Figure 11:
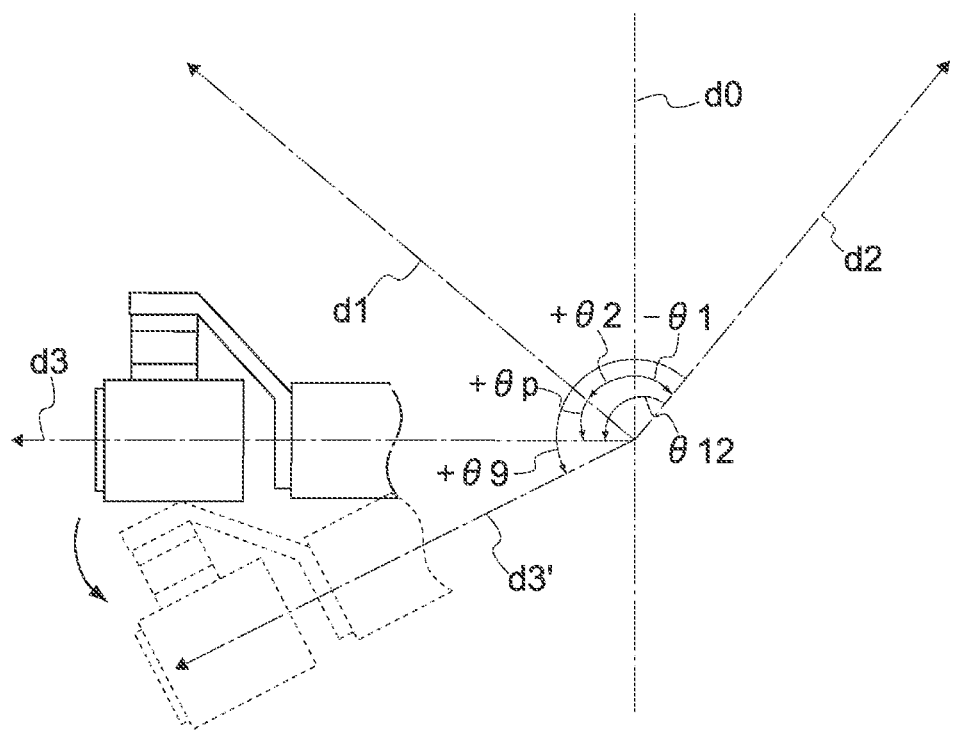
FIG. 11 is a conceptual diagram collectively showing the front direction of the drone airframe, the front direction of the controller, an input direction newly input by the user, and a photographing direction of a current camera.

FIG. 11 is a conceptual diagram collectively showing the front directions d1 and d2 of the drone airframe 20 and the controller 10, the current posture of the camera 23 in the pan direction (photographing direction d3), and an input direction d3' newly input by the user.

The CPU 201 calculates the relative angles θ9 and θ12 based on the data acquired from the input control circuit, the sensor data acquired from the compass sensors 11 and 208, and the angle θp formed by the front direction d1 of the drone airframe 20 and the current photographing direction d3 of the camera 23.

Here, the relative angle θ9 is an angle formed by the front direction d2 of the controller 10 and the input direction d3' newly input by the user. Furthermore, the relative angle θ12 is an angle formed by the front direction d2 of the controller 10 and the current photographing direction d3 of the camera 23.

Next, the CPU 201 newly calculates a control angle θp' of the camera 23 in the pan direction based on the calculated relative angles θ9 and θ12, and outputs a control signal based on the control angle θp' to the gimbal actuator 207. Referring to FIG. 11 as an example, the angle of the clockwise (direction) and the negative angle (negative direction), when the clockwise angle (direction) is defined as the negative angle (negative direction) and the counterclockwise angle (direction) is defined as the positive angle (positive direction), the control angle θp' is calculated, for example, by the following equation (4).

$$\theta p'=-\theta 1+(+\theta 9)-(+\theta 2)-(+\theta p)=\theta 9-(\theta 1+\theta 2+\theta p)=\theta 9-\theta 12 \quad (4)$$

[Step S109: Calculate Roll Control Angle]

Figure 12:
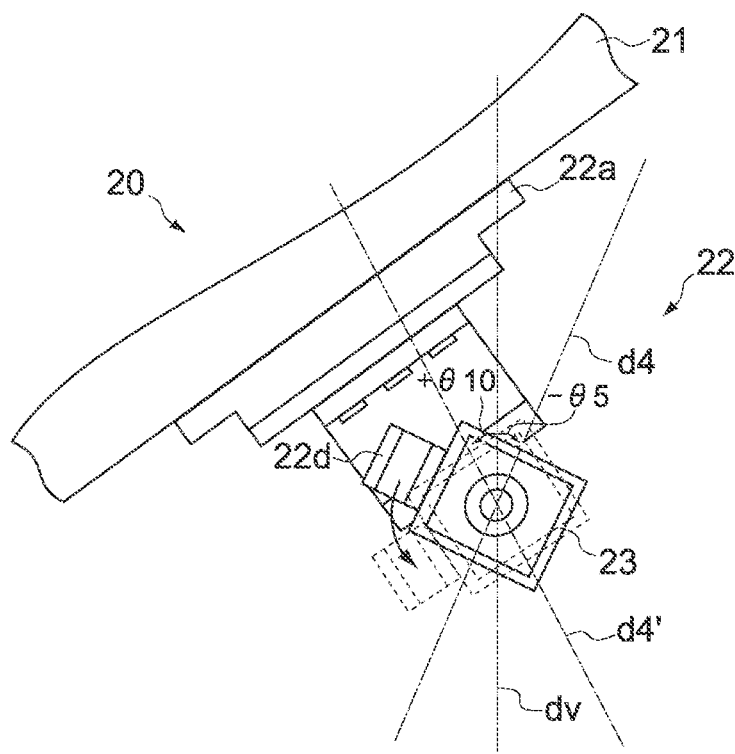
FIG. 12 is a schematic view schematically showing the drone airframe tilted in the roll direction.

FIG. 12 is a schematic view schematically showing the drone airframe 20 tilted in the roll direction. The CPU 201 newly calculates a control angle θr' based on a sensor data (angle θ10) acquired from the acceleration sensor 13 and the angle θ5 formed by the current camera 23 in the roll direction and the vertical direction dv, and outputs a control signal based on the control angle θr' to the gimbal actuator 207.

Referring to FIG. 12 as an example, when the clockwise angle (direction) is defined as the negative angle (negative direction) and the counterclockwise angle (direction) is defined as the positive angle (positive direction), the control angle θr' is calculated, for example, by the following equation (5).

$$\theta r'=(+\theta 10)-(-\theta 5)=\theta 10+\theta 5 \quad (5)$$

[Step S110: Calculate Tilt Control Angle]

Figure 13:
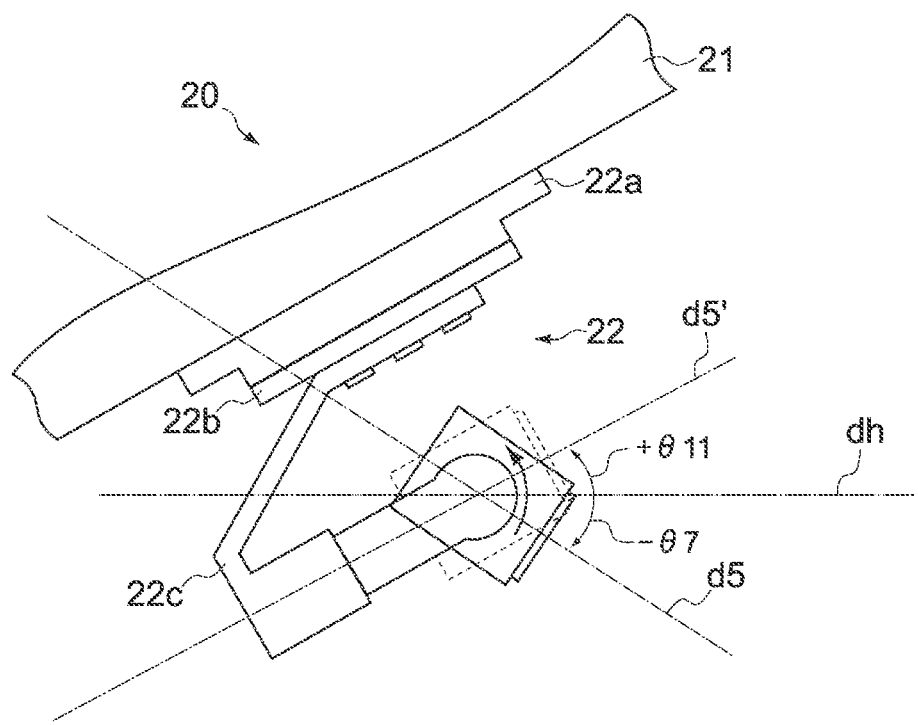
FIG. 13 is a schematic view schematically showing the drone airframe tilted in the roll direction.

FIG. 13 is a schematic view schematically showing the drone airframe 20 tilted in the tilt direction. The CPU 201 newly calculates a control angle θt' based on a sensor data (angle θ11) acquired from the acceleration sensor 13 and the angle θ7 formed by the current camera 23 in the tilt direction and the horizontal direction dh, and outputs a control signal based on the control angle θr' to the gimbal actuator 207.

Referring to FIG. 13 as an example, when the clockwise angle (direction) is defined as the negative angle (negative direction) and the counterclockwise angle (direction) is defined as the positive angle (positive direction), the control angle θt' is calculated, for example, by the following equation (6).

$$\theta t'=(+\theta 11)-(-\theta 7)=\theta 11+\theta 7 \quad (6)$$

[Step S111: Re-Control Gimbal]

The gimbal actuator 207 converts the control signal based on the control angle θp' obtained from the CPU 201 into the motive power for rotating the first connecting portion 22b around the rotation axis X1. At this time, the gimbal actuator 207 rotates the first connecting portion 22b by θp' in the positive direction. Thus, as shown in FIG. 11, the second connecting portion 22c is rotated by θp' in the positive direction, and the posture of the camera 23 in the pan direction becomes a posture newly specified by the user.

Furthermore, the gimbal actuator 207 converts the control signal based on the control angle θr' obtained from the CPU 201 into the motive power for rotating the third connecting portion 22d around the rotation axis X3. At this time, the gimbal actuator 207 rotates the third connecting portion 22d by θr' in the positive direction. Thus, as shown in FIG. 12, the third connecting portion 22d is rotated by θr' in the positive direction, and the posture of the camera 23 in the roll direction becomes a posture newly specified by the user.

Furthermore, the gimbal actuator 207 converts the control signal based on the control angle θt' obtained from the CPU 201 into the motive power for rotating the camera 23 around the rotation axis X2. At this time, the gimbal actuator 207 rotates the camera 23 by θt' in the positive direction. Thus, as shown in FIG. 13, the camera 23 is rotated by θt' in the positive direction, and the posture of the camera 23 in the tilt direction becomes a posture newly specified by the user <Functions and Effects>

In the related art, in a case where a camera mounted on a commercially available drone airframe is controlled, a relative control to a current photographing direction of the camera is performed. Specifically, for example, a photographed image of the camera is displayed on a mobile application operated on a tablet terminal or the like, and a user controls the camera via a button or the like displayed on the mobile application while watching the photographed image.

Here, because the user requires concentrated force only by steering the drone airframe, the control of the camera mounted on the drone airframe is often controlled by a dedicated camera operator. In this case, it is difficult for the camera operator to instantly grasp a current posture and movement of the drone airframe, and it is difficult to keep the camera toward a specific direction due to a time lag caused in controlling the camera.

In particular, in a case where the camera mounted on the drone airframe is controlled, the drone airframe moves in the pan direction, the roll direction, and the tilt direction. When the user operates the drone airframe using a first person viewpoint (FPV), the front direction (traveling direction) of the drone airframe changes point by point. Therefore, it is virtually impossible for the camera operator to instantaneously perform the relative control in accordance with the movement of the drone airframe.

In contrast, in the steering system 100 of the present embodiment, as shown in FIG. 8, the posture of the camera 23 in the pan direction becomes the posture specified by the user not depending on the front direction d1 (traveling direction) of the drone airframe 20.

For example, if the stick 12 is turned to the right when the user (controller 10) is facing north, the camera 23 faces east, and if the stick 12 is turned to the left when the user (controller 10) is facing west, the camera 23 faces south.

In addition, in a case where the posture of the camera 23 in the roll direction and in the tilt direction is specified, the posture of the camera 23 becomes the posture specified by the user not depending on the tilt of the drone airframe 20, as shown in FIGS. 9 and 10.

Therefore, according to the steering system 100 of the present embodiment, an intuitive control of the camera 23 by the user becomes possible not depending on the posture of the drone airframe 20, and the posture of the camera 23 is sequentially and continuously controlled to the posture specified by the user. Therefore, the user can stably photograph the desired direction.

<Modifications>

Although the embodiments of the present technology have been described above, the present technology is not limited to the embodiments described above, and of course various modifications may be made thereto.

Figure 14:
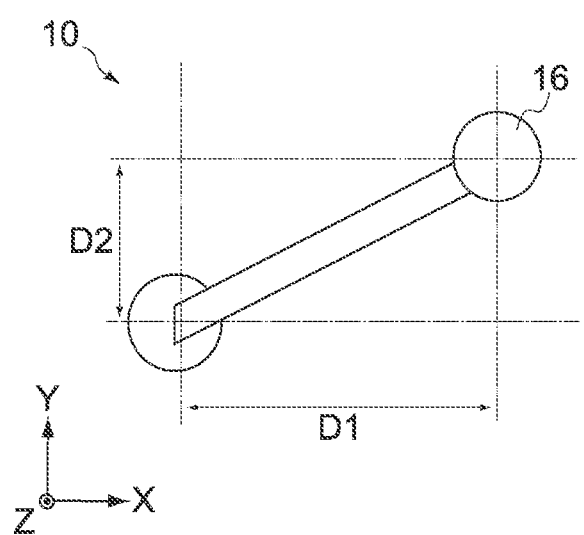
FIG. 14 is a simplified schematic diagram showing a configuration example of a controller according to a modification of the present technology.

FIG. 14 is a simplified schematic diagram showing a configuration example of the controller 10 according to a modification of the present technology. In the above embodiment, for example, a stick 16 may be used instead of the acceleration sensor 13. In this case, when a range of motion D1 of the stick 16 in the X-axis direction is taken as a rotation range of the camera 23 in the roll direction, and when a range of motion D2 of the stick 16 in the Y-axis direction is taken as a rotation range of the camera 23 in the tilt direction, the posture of the camera 23 in the roll direction and the tilt direction may be specified.

Furthermore, the controller 10 in the above embodiment may be configured to have, for example, a lock mechanism in which the posture of the stick 12 is maintained even if the user releases his/her fingers from the stick 12.

Furthermore, in the above embodiment, for example, a touch panel may be adopted instead of the stick 12. In this case, the touch panel may have a mechanism of continuing to hold a point touched by the user.

In addition, in the steering system 100 of the above-described embodiment, the posture of the camera 23 is specified by manually operating the controller 10 by the user, but it is not limited thereto, and the posture of the camera 23 may be automatically controlled.

The controller 10 of the above embodiment is configured to include the compass sensor 11 and the acceleration sensor 13, but it is not limited thereto, and the controller 10 may include a gyro sensor (not shown) instead of or in addition to the acceleration sensor 13. The gyro sensor outputs the sensor data obtained by detecting the tilt of the controller 10 to the transmitter 14.

Similarly, the drone airframe 20 may also be configured with the gyro sensor (not shown) instead of or in addition to the acceleration sensor 209. The gyro sensor outputs the sensor data obtained by detecting the tilt of the drone airframe 20 to the CPU 201.

Here, the CPU 201 of the present embodiment may calculate the control angle of the camera 23 in the roll direction and in the tilt direction not only based on the sensor data acquired from the acceleration sensors 13 and 209 but also based on the sensor data acquired from the controller 10 and the gyro sensor mounted on the drone airframe 20, and output the control signal based on the control angle to the gimbal actuator 207. Any types of the gyro sensors may be employed, for example, including a mechanical type, an optical type, a fluid type, a geomagnetic type, a capacitive type, or a vibration type.

<Others>

The embodiments of the present technology may include, for example, the moving body, the steering system, the operations performed on the moving body or the steering system, the program for causing the moving body to function, and a non-transitory tangible medium on which the program is recorded, as described above.

Furthermore, in the steering system 100 of the present embodiment, the description has been made on the assumption that the moving body is a flying object, but it is not limited to this. The present technology may be applied to a moving body (for example, a robot) other than the flying object, and an application thereof is not particularly limited. Incidentally, the flying object includes an unmanned airplane or an unmanned helicopter or the like in addition to the so-called drone.

In addition, the effects described herein are illustrative or exemplary only and not restrictive. In other words, the present technology may have other effects apparent to those skilled in the art from the description herein together with the above effects or in place of the above effects.

The favorable embodiments of the present technology have been described above in detail with reference to the accompanying drawings. However, the present technology is not limited to these examples. It is clear that persons who have common knowledge in the technical field of the present technology could conceive various alterations or modifications within the scope of a technical idea according to an embodiment of the present technology. It is understood that of course such alterations or modifications also fall under the technical scope of the present technology.

The present technology may also have the following structures.

(1)

A moving body, including:

an imaging unit;

a first detection unit that detects a front direction of the moving body; and a control unit that controls a posture around a first axis of the imaging unit to a posture specified by a steering apparatus based on an output of the first detection unit, an output of a second detection unit that detects a front direction of the steering apparatus that steers the imaging unit, and input data generated by the steering apparatus.

(2)

The moving body according to (1), in which the first detection unit detects a tilt around a second axis of the moving body, the second detection unit detects a tilt of the steering apparatus with respect to a horizontal direction, and the control unit controls a posture of the imaging unit around the second axis to a posture specified by the steering apparatus based on the outputs of the first and second detection units.

(3)

The moving body according to (2), in which the first detection unit detects a tilt around a third axis of the moving body, the second detection unit detects a tilt of the steering apparatus with respect to a vertical direction, and the control unit controls a posture of the imaging unit around the third axis to the posture specified by the steering apparatus based on the outputs of the first and second detection units.

(4)

The moving body according to (3), further including:

a main body of the moving body; and a gimbal that connects the main body of the moving body and the imaging unit and supports the imaging unit rotatably around the first, second, and third axes.

(5)

The moving body according to (3) or (4), in which the control unit calculates a control angle, which is a necessary angle for shifting a current posture of the imaging unit to a posture specified by the control unit, based on outputs of the first detection unit and the control unit.

(6)

The moving body according to (5), in which the control unit calculates, as the control angle around the first axis, a difference between an angle formed by the front direction of the steering apparatus and an input direction input to the steering apparatus, and an angle formed by the front direction of the steering apparatus and the front direction of the moving body.

(7)

The moving body according to (5) or (6), in which the control unit calculates, as the control angle around the second axis, a difference between an angle formed by the third axis and the horizontal direction and an angle formed by the steering apparatus and the horizontal direction.

(8)

The moving body according to any one of (5) to (7), in which the control unit calculates, as the control angle around the third axis, a difference between an angle formed by the first axis and the vertical direction and an angle formed by the steering apparatus and the vertical direction.

(9)

The moving body according to any one of (3) to (8), in which the first detection unit includes a geomagnetic sensor for detecting the front direction of the moving body, and an acceleration sensor for detecting the tilts around the second and third axes of the moving body, and the second detection unit includes a geomagnetic sensor for detecting the front direction of the steering apparatus, and an acceleration sensor for detecting the tilts with respect to the horizontal direction and the vertical direction of the steering apparatus.

(10)

The moving body according to any one of (1) to (9), in which the moving body is a flight body.

(11) A steering system, including:

a moving body including an imaging unit, a first detection unit that detects a front direction of the moving body, and a control unit that controls a posture around a first axis of the imaging unit to a posture specified by a steering apparatus based on an output of the first detection unit, an output of a second detection unit that detects a front direction of the steering apparatus that steers the imaging unit, and input data generated by the steering apparatus; and the steering apparatus that includes the second detection unit and controls the imaging unit.

(12)

A control method including a control unit, including:

acquiring an output of a first detection unit for detecting a front direction of a moving body;

acquiring an output of a second detection unit for detecting a front direction of a steering apparatus for steering an imaging unit mounted on the moving body;

acquiring input data generated by the steering apparatus; and controlling a posture of the imaging unit to a posture specified by the steering apparatus based on the outputs of the first and second detection units and the input data.

(13)

A program that causes a moving body to execute steps of:

acquiring an output of a first detection unit for detecting a front direction of a moving body;

acquiring an output of a second detection unit for detecting a front direction of a steering apparatus for steering an imaging unit mounted on the moving body;

acquiring input data generated by the steering apparatus; and controlling a posture of the imaging unit to a posture specified by the steering apparatus based on the outputs of the first and second detection units and the input data.

REFERENCE SIGNS LIST

10 controller
11, 208 compass sensor
12 stick
13, 209 acceleration sensor
14 transmitter
20 drone airframe
21 main body of drone airframe
22 gimbal
23 camera
100 steering system
200 sensor group
207 gimbal actuator
X1, X2, X3 rotation axis

The invention claimed is:

1. A moving body, comprising:

an imaging unit;

a first detection unit that detects a front direction of the moving body; and a control unit that controls a posture around a first axis of the imaging unit to a posture specified by a steering apparatus based on an output of the first detection unit, an output of a second detection unit that detects a front direction of the steering apparatus that steers the imaging unit, and input data generated by the steering apparatus.

2. The moving body according to claim 1, wherein
the first detection unit detects a tilt around a second axis of the moving body,
the second detection unit detects a tilt of the steering apparatus with respect to a horizontal direction, and
the control unit controls a posture of the imaging unit around the second axis to a posture specified by the steering apparatus based on the output of the first detection unit and the output of the second detection unit.

3. The moving body according to claim 2, wherein
the first detection unit detects a tilt around a third axis of the moving body,
the second detection unit detects a tilt of the steering apparatus with respect to a vertical direction, and
the control unit controls a posture of the imaging unit around the third axis to the posture specified by the steering apparatus based on the output of the first detection unit and the output of the second detection unit.

4. The moving body according to claim 3, further comprising:
a main body of the moving body; and
a gimbal that connects the main body of the moving body and the imaging unit and supports the imaging unit rotatably around the first axis, the second axis, and the third axis.

5. The moving body according to claim 3, wherein
the control unit calculates a control angle, which is a necessary angle for shifting a current posture of the imaging unit to a posture specified by the control unit, based on the output of the first detection unit and an output of the control unit.

6. The moving body according to claim 5, wherein
the control unit calculates, as the control angle around the first axis, a difference between an angle formed by the front direction of the steering apparatus and an input direction input to the steering apparatus, and an angle formed by the front direction of the steering apparatus and the front direction of the moving body.

7. The moving body according to claim 6, wherein
the control unit calculates, as the control angle around the second axis, a difference between an angle formed by the third axis and the horizontal direction and an angle formed by the steering apparatus and the horizontal direction.

8. The moving body according to claim 7, wherein
the control unit calculates, as the control angle around the third axis, a difference between an angle formed by the first axis and the vertical direction and an angle formed by the steering apparatus and the vertical direction.

9. The moving body according to claim 3, wherein
the first detection unit includes a geomagnetic sensor for detecting the front direction of the moving body, and an acceleration sensor for detecting the tilt around the second axis and the tilt around the third axis of the moving body, and
the second detection unit includes a geomagnetic sensor for detecting the front direction of the steering apparatus, and an acceleration sensor for detecting the tilt with respect to the horizontal direction of the steering apparatus and the tilt with respect to the vertical direction of the steering apparatus.

10. The moving body according to claim 1, wherein
the moving body is a flight body.

11. A steering system, comprising:
a moving body including
an imaging unit,
a first detection unit that detects a front direction of the moving body, and
a control unit that controls a posture around a first axis of the imaging unit to a posture specified by a steering apparatus based on an output of the first detection unit, an output of a second detection unit that detects a front direction of the steering apparatus that steers the imaging unit, and input data generated by the steering apparatus; and
the steering apparatus that includes the second detection unit and controls the imaging unit.

12. A control method including a control unit, comprising:
acquiring an output of a first detection unit for detecting a front direction of a moving body;
acquiring an output of a second detection unit for detecting a front direction of a steering apparatus for steering an imaging unit mounted on the moving body;
acquiring input data generated by the steering apparatus; and
controlling a posture of the imaging unit to a posture specified by the steering apparatus based on the output of the first detection unit and the output of the second detection unit and the input data.

13. A non-transitory computer-readable medium having stored thereon, computer-executable instructions which, when executed by a processor of a moving body, cause the processor to execute operations, the operations comprising:
acquiring an output of a first detection unit for detecting a front direction of a moving body;
acquiring an output of a second detection unit for detecting a front direction of a steering apparatus for steering an imaging unit mounted on the moving body;
acquiring input data generated by the steering apparatus; and
controlling a posture of the imaging unit to a posture specified by the steering apparatus based on the output of the first detection unit and the output of the second detection unit and the input data.

* * * * *